United States Patent [19]

Norcross

[11] 4,270,646
[45] Jun. 2, 1981

[54] SELF-ADJUSTING AUTOMOTIVE CLUTCH LINK

[75] Inventor: Paul D. Norcross, Des Plaines, Ill.

[73] Assignee: Thexton Manufacturing Company, Minneapolis, Minn.

[21] Appl. No.: 6,562

[22] Filed: Jan. 25, 1979

[51] Int. Cl.³ .................... F16D 11/00; F16D 65/74
[52] U.S. Cl. .......................... 192/111 A; 188/196 A
[58] Field of Search .................... 192/111 R, 111 A; 188/196 A

[56] References Cited

U.S. PATENT DOCUMENTS

| 3,286,803 | 11/1966 | Zeidler | 192/111 A |
| 3,406,800 | 10/1968 | Buchanan et al. | 192/111 R |
| 3,489,257 | 1/1970 | Nakano | 192/111 A |

Primary Examiner—C. J. Husar
Assistant Examiner—Conrad Berman
Attorney, Agent, or Firm—H. Dale Palmatier

[57] ABSTRACT

In an automotive clutch having a clutch disc clamped between the flywheel and a movable pressure plate held by strong springs anchored on the rotating cover and lifted by action of a throw out bearing movable concentrically of the transmission input shaft to engage the release fingers which lift the pressure plate, and a clutch pedal in the operator's compartment of the vehicle, a linkage for moving the throw out bearing against the release fingers, the linkage including a length adjustable hydraulic fluid filled link and a valve thereon to bleed off a small quantity of the hydraulic fluid when the release fingers bear firmly against the throw out bearing while the linkage is in rest position to relieve pressure on the hydraulic fluid and allow the throw out bearing to move away from the release fingers.

24 Claims, 10 Drawing Figures

SELF-ADJUSTING AUTOMOTIVE CLUTCH LINK

This invention relates to automotive clutch operating apparatus, and more particularly to such apparatus that is self-adjusting.

BACKGROUND OF THE INVENTION

Automotive type clutches serve to provide a mechanical driving connection between the crankshaft and the flywheel of the engine and the input shaft of the transmission. The basic clutch construction has been nearly standard for many years and includes a rigid cover bolted to the flywheel of the engine; a pressure plate urged by strong springs anchored on the cover toward the flywheel for the purpose of clamping the clutch plate tightly between the pressure plate and the flywheel. The clutch plate is splined to the input shaft of the transmission for transmitting rotary power from the engine flywheel to the transmission.

The clutch is disengaged by pulling or lifting the pressure plate away from the flywheel so as to release the clutch plate which is clamped therebetween, thereby allowing the flywheel and pressure plate to continue to revolve with the crankshaft of the engine while the clutch plate and clutch disc are allowed to stop and remain stationary without transmitting rotary power to the transmission. The pressure plate is lifted away from the flywheel by a number of release fingers which are pivoted on the cover and connected to the pressure plate for prying the pressure plate away from the flywheel against the force of the strong springs. The release fingers are operated by a release bearing, sometimes known as a throw out bearing, arranged concentrically of the input shaft to the transmission. The throw out bearing is normally spaced slightly from the release fingers, and when the clutch is to be disengaged, the throw out bearing is moved into engagement with the release fingers under the influence of the release fork or throw out lever which is pivotally mounted on the stationary transmission housing. A linkage in most clutches interconnects the release fork with the clutch lever found in the operator's compartment of the vehicle.

As the clutch disc wears, it reduces in thickness; and compensation is made for the reduced thickness by the springs continually urging the pressure plate toward the flywheel so that the clutch disc remains clamped tightly therebetween. As the clutch disc wears more and more, the pressure plate must move further toward the flywheel, and as this occurs, the release fingers are tilted slightly so as to move closer and closer to the throw out bearing in its retracted position. Eventually, as sufficient wear in the clutch disc occurs, the release fingers will continually bear against the throw out bearing which cannot move significantly away from the release fingers, and as a result, the throw out bearing continually bears against the release fingers with substantial pressure. This pressure causes an influence on the pressure plate, tending to lift the pressure plate away from the flywheel and clutch disc, and as this occurs, the clutched disc may slip between the flywheel and pressure plate instead of being clamped tightly. Such slippage of the clutch disc causes excessive and unusual wear. Also, the throw out bearing will often fail under the continual pressure by the release fingers.

Substantial efforts have been made in the past to provide for readjustment of the position of the throw out bearing as the clutch disc wears so that such slippage of the clutch disc will not occur. In most clutch linkages, between the release fork and the clutch pedal, there is a manually adjustable link which may be adjusted as to length so as to readjust the rest position of the throw out bearing and reestablish a spaced relation or clearance between the throw out bearing and the release fingers. It has been experienced in the past that the adjustments in the linkage are usually inaccessible, and are usually not known to the owners of automobiles so that such linkage adjustments are simply neglected.

Numerous attempts have been made to automatically adjust the length of the linkage between the release fork and the clutch pedal, but none of such prior automatic adjusting mechanisms have found success.

A number of attempts have been made in the prior art to mechanically adjust the length of the linkage in response to wear of the clutch plate. All of these mechanisms have been exceedingly complicated for the purpose intended and have undoubtedly produced substantial wear in themselves so as to be quite unreliable.

Other prior art devices have attempted to utilize a hydraulic master cylinder operated by the clutch pedal and then the cylinder and piston arrangement for operating the release fork of the clutch while simultaneously adjusting for the reduced thickness of the clutch disc. Such mechanisms are also unduly complicated and add considerable expense to the automotive clutch mechanism which added expense is completely unnecessary.

SUMMARY OF THE INVENTION

An object of the invention is the provision of an extremely simple self-adjusting apparatus for compensating for the wear of the clutch disc in an automotive type clutch so as to avoid the excessive wear of the clutch disc and to avoid early failure of the throw out bearing.

A feature of the present invention relates to the use of a length-adjustable, and substantially closed hydraulic fluid filling telescoping link in the linkage between the throw out bearing in the clutch and the operator's clutch pedal in the driver's compartment of the vehicle. The fluid in the link may be conventional hydraulic fluid or may be an evaporative type of dripless penetrating oil, internal type, or may be a semi-solid type of fluid such as chassis lubricating material. In normal functioning of the link, the hydraulic fluid in the telescoping link maintains the link at a predetermined length. Only when the throw out bearing continues to bear against the release fingers will the amount of hydraulic fluid in the telescoping link be changed. Under these circumstances, a small quantity of the hydraulic fluid in the telescoping link is bled off so as to allow the telescoping link to change its length. In some constructions, the length of the link will be shortened by bleeding off a small quantity of the hydraulic fluid; and in other constructions, the length of the telescoping link will be lengthened by bleeding off a small quantity of the hydraulic fluid.

Accordingly, clutch linkages which push on the outer end of the release fork, and linkages which pull on the outer end of the release fork are both accommodated according to the present invention.

The hydraulic fluid filled telescoping link may be located in the linkage between the release fork and the clutch pedal, but on the other hand, the hydraulic fluid filled telescoping link may be located between the throw out bearing and the release fork. The end result is the same, whichever arrangement is utilized, the end result being the accommodation of further retraction of the throw out bearing away from the release fingers as the release fingers gradually tilt outwardly toward the throw out bearing as the clutch disc wears.

Bleeding off of the hydraulic fluid from the telescoping link is facilitated through the use of a pressure-responsive valve which closes as soon as the length of the link has been adjusted sufficiently to relieve the excessive pressure exerted by the release fingers against the throw out bearing.

The present invention provides substantial advantage over anything seen in the prior art. The length adjustable and substantially closed hydraulic fluid filled telescoping link is extremely simple in construction and operation and is devoid of any complicated mechanical mechanism so as to be extremely simple and reliable for long periods of time. The telescoping link is essentially self-lubricating so as to accommodate change in length at such times as it may be necessary. The use of the telescoping link, according to the present invention, is substantially more simple than the original equipment supplied in all prior clutch linkages and essentially needs no attention whatsoever for the life of the vehicle. It may be desirable to service the telescoping link and adjust its length manually at such times as normal wear necessitates replacement of the clutch disc. However, the present invention will greatly extend the life of the clutch disc and throw out bearing by maintaining a proper clearance adjustment.

It is emphasized that the present invention may be universally applied to all automotive clutches, either as an attachment or as an adaptation, or as original equipment.

In ordinary operation of a clutch incorporating the present invention, there are no additional relatively movable parts. The self-adjustment (or relative movement of parts) of the length-adjustable link only occurs when ordinary wear of the clutch disc changes the clearances that should be maintained. Whenever hydraulic fluid is bled off from the link, the throw out bearing and the fluid serves to lubricate the relatively movable parts of the link so that the link is freely adjustable on a continuing basis.

In certain clutches, the occurrence of improper clearances causes sufficient pressure on the throw out bearing as to cause continual operation and ultimate failure of the bearing long before there is slippage and damage of the clutch disc. The present invention will respond to such loss of clearances as would cause such damage and failure of the throw out bearing, and reestablish the proper clearances.

BRIEF DESCRIPTION OF THE DRAWINGS

FIG. 6 is a diagrammatic elevation view, partly in section, illustrating a third modified form of the present invention.

DETAILED SPECIFICATION

Figures 1, 2, 3:
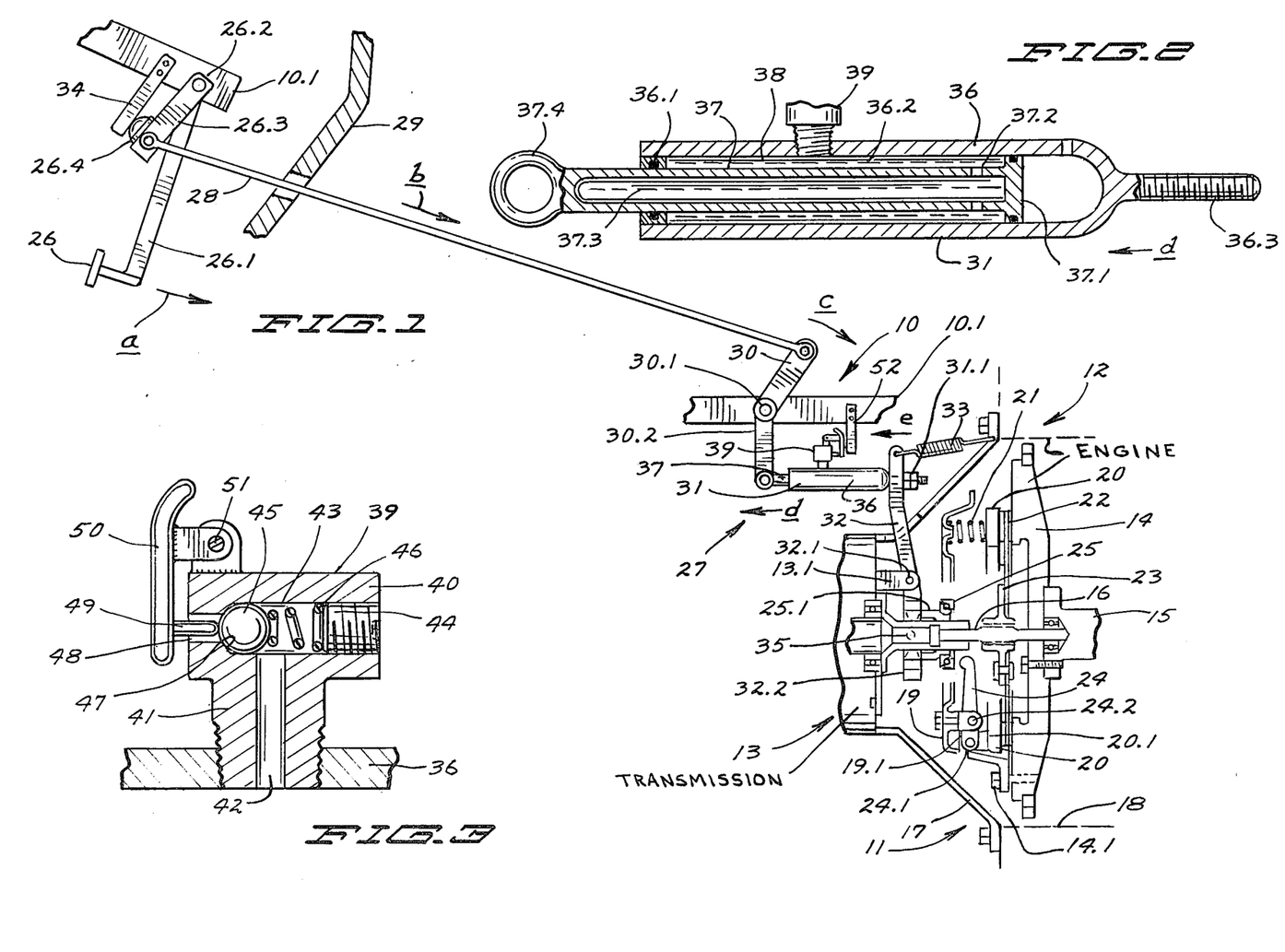
FIG. 1 is a generally diagrammatic illustration of a first embodiment of the present invention.
FIG. 2 is an enlarged detail section view illustrating the hydraulic fluid filled telescoping link incorporated in the apparatus of FIG. 1.
FIG. 3 is an enlarged detail section view of the relief valve utilized in the apparatus of FIG. 1.

In the form of the invention illustrated in FIGS. 1–3, the clutch operating apparatus is indicated in general by numeral 10 and is connected to the automotive clutch 11 which interconnects the engine 12 with the transmission 13. More specifically, the clutch 11 provides a driving connection between the flywheel 14 which is mounted on the main drive shaft or crank shaft 15 of the engine 12, and the input shaft 16 of the transmission.

Although the details of various clutches made by various automotive manufacturers will vary slightly, the principal components of all transmissions are similar to those illustrated herein. The clutch 11 is housed within a stationary bell housing 17 by which the transmission housing is affixedly interconnected with the engine block 18.

The clutch 11 includes a rigid rotary cover 19 which is affixed to the flywheel 14 of the engine as by bolts 14.1. The cover, which is generally annular in shape, confines the movable parts of the clutch assembly. A rigid pressure plate 20 confronts the rear face of the flywheel 14, and is continually urged toward the flywheel 14 by very strong springs 21 which are spaced from each other around the periphery of the annular cover 19 and which are anchored against the cover 19 and bear against the pressure plate 20. The pressure plate will continuously revolve with the cover 19 and flywheel 14.

The clutch disc 22 is sandwiched between the pressure plate 20 and the flywheel 14 and is clamped under great force against the flywheel 14 by the pressure plate. The clutch disc 22 is on a hub 23 which is splined to the transmission input shaft 16. The clutch disc 22 performs the function of transmitting rotary power from the flywheel, to which it is clamped, to the transmission input shaft 16. Means are provided in the clutch 11 for lifting the pressure plate 20 away from the clutch disc 22 and the flywheel 14. Such means include a plurality of substantially radially oriented elongate release fingers 24 spaced from each other around the periphery of the cover 19 and adjacent the outer periphery of the pressure plate 20. At each of the release fingers 24, the pressure plate 20 is provided with an upstanding ear 20.1 to which the release finger is connected by a pivot 24.1. Each of the release fingers 24 is also connected by another pivot pin 24.2 to an adjacent ear 19.1 which is affixed on the cover 19 as by a cap screw.

Another essential part of the clutch 11 is the throw out bearing 25 which is concentric of the transmission input shaft 16. The throw out bearing serves the purpose of engaging and tilting the release fingers 24 forwardly toward the flywheel 14 for the purpose of disengaging the clutch. As the release fingers are tilted forwardly toward the flywheel 14, the pivot 24.1 causes the pressure plate 20 to be lifted away from the flywheel 14. The clutch disc 22 is thereby released so as to disconnect the driving relationship between the flywheel 22 and the clutch disc. The clutch disc is thereby permitted to move slightly along the splined portion of the shaft 16 so that the clutch disc may stop under the continuing load of the transmission each though the flywheel 14 and pressure plate 20 continue to revolve at high speed.

When the throw out bearing 25 is moved away from the flywheel 14 so as to allow the release fingers to tilt rearwardly away from the flywheel, the pressure plate 20 is again urged by the very strong springs 21 toward the flywheel 14 to again clamp the clutch disc 22 against the flywheel and thereby reengage the clutch to reestablish the driving relation between the flywheel 14 and the transmission input shaft 16.

A linkage is provided between the throw out bearing 25 and the clutch pedal 26 which is located in the operator's cab of the vehicle, and such linkage is indicated in general by numeral 27. The linkage 27 may take various forms and shapes, according to the particular design of the automobile or truck wherein the linkage is found. The linkage 27, as illustrated, includes a clutch pedal lever 26.1 mounted on a pivot pin 26.2 on a frame part 10.1 of the vehicle. A lever arm 26.3 swings with the lever 26.1 and pivotally carries one end of a linkage rod 28 which extends through the fire wall 29 of the vehicle. The other end of the linkage rod is pivotally connected to a bell crank arm 30 which is mounted by a pivot 30.1 to another of the frame parts 10.1 of the vehicle. The other end 30.2 of the bell crank arm is pivotally connected to one end of a length adjustable hydraulic fluid filled link 31 hereinafter more fully described, and which is secured to the release fork 32 by a pair of lock nuts 31.1 on the stem end of the link 31. A return spring 33 is connected under tension between the outer end of the release fork 32 and the bell housing 17 of the transmission so as to continually exert resilient force on the release fork in a forward direction. Return spring 33 maintains the linkage 27 in its rest position and causes the lever arm 26.3 with a bumper 26.4 thereon to bear against the rigid stop 34 which is affixed to the frame part 10.1.

The release fork 32 is tiltably mounted on a pivot pin 32.1 on the stationary mounting ears 13.1 which are rigid with the transmission housing 13.

The release fork has a bifurcated outer end 32.2, and each of the arms of the bifurcated forward end of the release fork has a pivot pin 35 thereon. The pins 35 protrude into the conventional annular groove of the mounting sleeve 25.1 of the throw out bearing 25.

Accordingly, when the clutch 11 is to be disengaged, the clutch pedal 26, which is a manual control, is swung by the operator's foot in the direction of arrow a, the linkage rod 28 is pushed in the direction of arrow b, the bell crank arm 30 is swung in the direction of arrow c, the link 31 is pulled in the direction of arrow d, and the release fork is tilted in the direction of arrow e, about pivot 32.1 whereby the sleeve 25.1 and throw out bearing 25 move forwardly along the shaft 16 toward the flywheel 14 so as to tilt the release fingers 24, causing the pressure plate 20 to be lifted away from the flywheel 14 to release the clutch disc 22. The clutch is thereby disengaged.

The length adjustable hydraulic fluid filled link 31 is illustrated in enlarged section in FIG. 2 and comprises a pair of hollow telescoping parts 36 and 37. The part 36 is a housing with a seal 36.1 at its open end which provides for the hollow piston rod 37 to slide therein. The hollow piston rod has a transverse piston-like plate 37.1 at its inner end with an O-ring seal thereon to seal tightly against the inner wall of the housing 36. The hollow piston rod 37 is provided with at least one aperture 37.2 to provide communication between the inner chamber 37.3 of the hollow piston rod 37 and the annular fluid chamber 36.2 which surrounds the outer periphery of the piston rod 37. Normally, the chambers 37.3 and 36.2, which are intercommunicating with each other, are otherwise closed so that the hydraulic fluid 38 therein may not escape.

It will be recognized that the piston rod 37 has an eyelet 37.4 formed on the end thereof for attachment to the lower end 30.2 of the bell crank arm 30.

The housing 36 has a threaded stem 36.3 thereon, upon which the lock nuts 31.1 are threaded for the purpose of clamping the end of the release fork on the end of link 31. The release fork 32 has a suitable aperture through which the end projection 36.3 extends.

A hydraulic fluid flow control valve 39 is mounted in a tapped aperture in the housing 36 to provide for relief of excess pressure in the hydraulic fluid 38 by releasing small quantities of the hydraulic fluid. The valve includes a housing 40 having a mounting stem or boss 41 threaded into the sidewall of the housing 36. The entry port 42 of the boss 41 provides flow communication into the interior housing 43 of the valve. A threaded plug 44 in one end of the interior housing confines a ball valve 45 and a spring 46 which continuously bears against the ball valve. The housing also defines a valve seat 47 against which the ball 45 normally rests and adjacent the output port 48 through which an operating stem 49 extends. The stem 49 is mounted on a lever arm or operator 50 mounted on a pivot 51 which extends through adjacent ears on the operator 50 and on the housing 40.

A stop 52 is affixed to the frame part 10.1 adjacent the link 31 and arranged so that when the link 31 is moved opposite the direction of arrow d, from the rest position, the valve 39 is opened so as to allow a small quantity of the hydraulic fluid 38 in the link 31 to escape.

The normal functioning of the clutch has previously been described herein. It is preferred to maintain a predetermined spacing between the throw out bearing 25 and the inner ends of the release fingers 24. However, as the clutch disc 22 begins to wear in the normal operation of the clutch, the release fingers gradually and progressively tilt slightly away from the flywheel 14 so that the release fingers move closer and closer to the throw out bearing.

Whereas, under normal circumstances, the return spring 33 returns the linkage 27 to its rest position wherein the throw out bearing 25 is spaced from the release fingers 24; however, when the clutch disc 22 has become worn to the extent that the release fingers tilt toward the throw out bearing, the throw out bearing may no longer, in the rest position of the linkage, withdraw entirely from engagement with the release fingers 24. If the release fingers 24 continue to bear against the throw out bearing 25 when the linkage 27 is in its rest position, the release fork is tilted slightly in a clockwise direction in FIG. 1, opposite to the direction of arrow e. As the release fork 32 is so tilted, the link 31 is moved slightly with the fork 32 in a direction opposite to arrow d. The operator 50 of the valve 39 bears tightly against the stop 52, whereupon the stem 49 lifts the ball 45 off its seat and allows a small quantity of the hydraulic fluid 48 to escape from the chambers 37.3 and 36.2. The escape of such fluid allows the link 31 to change its length under the pressure exerted by the release fork 32, and in the arrangement of link 31 as illustrated, the link will slightly lengthen. Such lengthening of the link 31 actually lengthens the entire linkage 27 so as to allow the throw out bearing to retract slightly away from the release fingers 24. As a result, there is no tendency for the throw out bearing 25 to act on the release fingers 24 with a tendency to loosen the clamping pressure on the clutch disc 22. Slipping of the clutch disc will thus not occur. But for the readjustment of the overall length of the linkage 27 which results in readjustment of the location of throw out bearing 25, the continued pressure between the throw out bearing and the release fingers would allow the clutch disc 22 to slip.

Figures 4, 10:
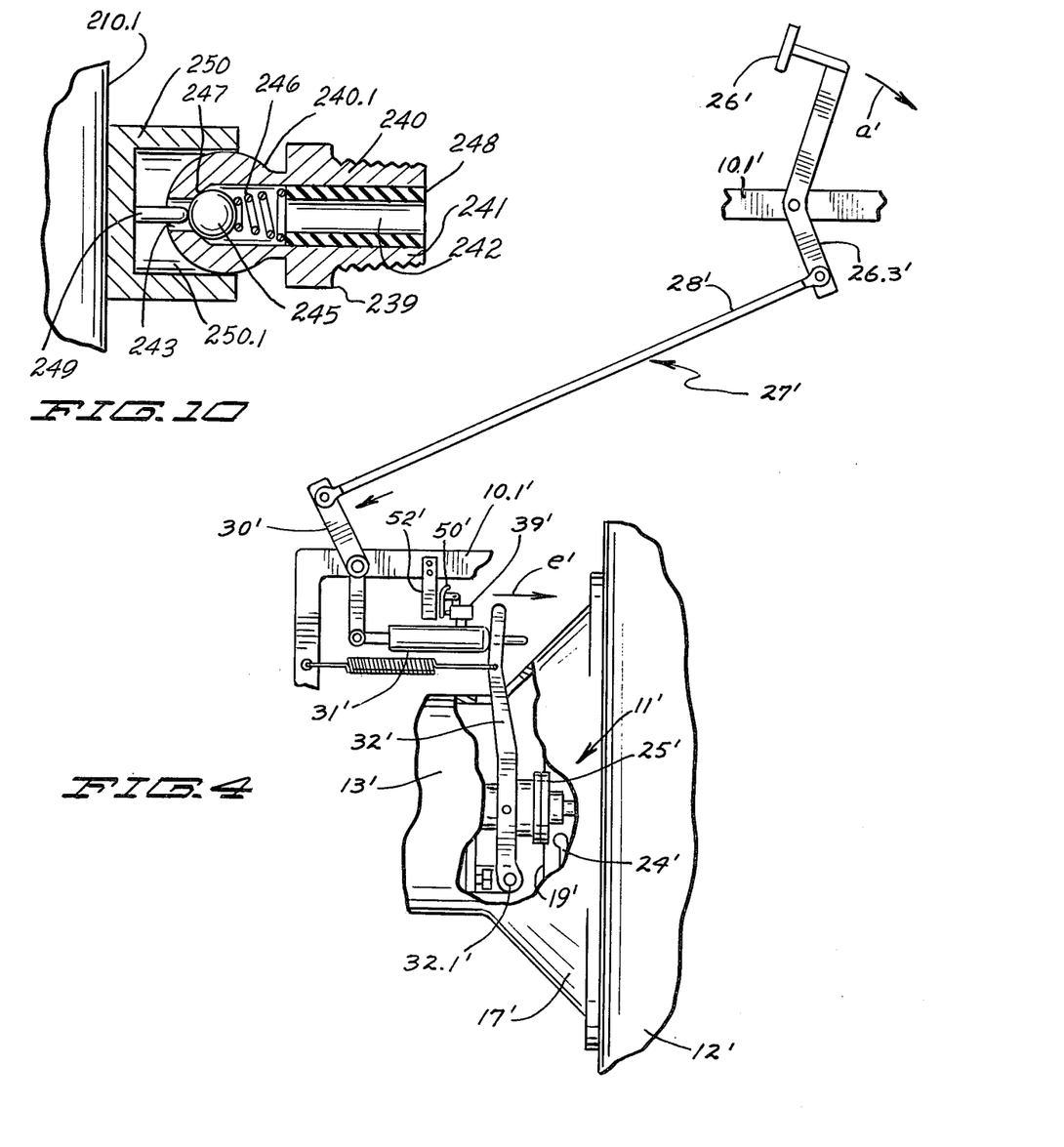
FIG. 4 is a diagrammatic sketch illustrating a modified form of the invention.
FIG. 10 is an enlarged detail section view of another form of relief valve that may be utilized in connection with applicant's invention.
Figure 5:
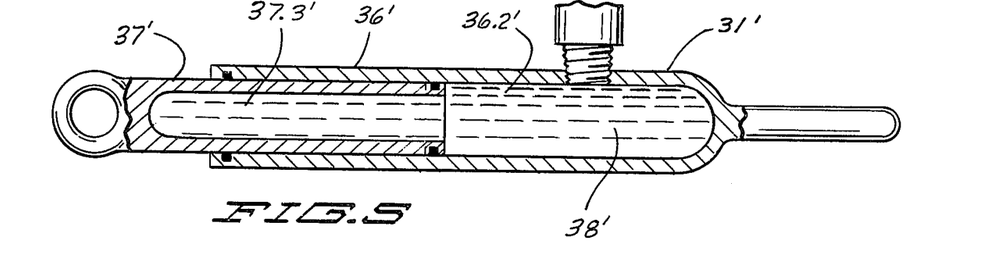
FIG. 5 is an enlarged detail section view of the hydraulic fluid filled telescoping link used in the form of the invention illustrated in FIG. 4.

In the form of the invention illustrated in FIGS. 4 and 5, the clutch linkage 27' is arranged somewhat differently thank the linkage 27 of FIG. 1. Whereas in FIG. 1, the linkage 27 is generally arranged for the type of vehicle wherein the engine is located forwardly of the operator's compartment, the linkage 27' of FIG. 4 is arranged generally for the type of vehicle wherein the operator's compartment is located generally above the engine 12'. The transmission housing 13' is again connected to the engine by the bell housing 17'. In this arrangement of the clutch 11' of which the cover 19', release fingers 24', and throw out bearing 25' are parts, the release lever 32' is mounted on a pivot 32.1' so that the release fork 32' must be tilted in a clockwise direction as indicated by the arrow e', or opposite to that illustrated in FIG. 1 for purposes of disengaging the clutch. Such movement of the release fork 32' requires that the length adjustable hydraulic fluid filled link 31' push against the end of the release fork 32' as the clutch pedal 26' is swung in the direction of arrow a'.

The linkage 27' includes the clutch lever arm 26.3', the linkage rod 28', and the bell crank arm 30' pivoted on the frame part 10.1'.

The length adjustable hydraulic fluid filled link 31' is illustrated in FIG. 5 and has a pair of telescoping parts 36' and 37'. The housing or outer part 36' is sealed to the outer periphery of the inner or piston part 37'. The fluid chamber 36.2' in the housing 36' and the chamber 37.3' in the piston part 37' are filled with hydraulic fluid 38' so that convergent telescoping of the parts 36' and 37' is impossible without bleeding off a quantity of the hydraulic fluid. A valve 39' like valve 39 as illustrated in FIG. 3 is utilized in this form of the invention with the operator 50' bearing against a stop 52' affixed on the frame part 10.1'. The valve 39' and stop 52' are arranged such that the operator 50' is closely adjacent the stop when the linkage 27' is in rest position. When the release fingers 24' tilt, due to the wearing of the clutch disc in the clutch, so that the release fingers continue to bear and exert pressure against the throw out bearing 25', the release fork will tilt slightly in a counterclockwise direction and urge the fluid filled link 31' to the left in FIG. 4, causing the valve operator to bear against the stop 52' and cause a small amount of hydraulic fluid to be released through the valve 39' from the link 31'. This release of fluid from the link 31' allows the link to change its length by shortening, which shortens the overall length of the linkage 27' and thereby allows the pressure to be relieved between the throw out bearing 25' and the release fingers 24'. This release of pressure on the release fingers 24' will prevent any slipping of the clutch disc as described above.

In the form of the invention illustrated in FIGS. 6-9, the length adjustable hydraulic fluid filled link, indicated in general by numeral 131, is located in the linkage 127 between the release fork 132 and the throw out bearing 125. The linkage 127 in FIG. 6 is similar to that portion of the linkage 27' in FIG. 4 between the release fork and the clutch pedal, with the exception that in the form of FIG. 6, the link 127.1 which bears directly against the release fork is essentially non-adjustable in length and may be a conventional link rod for connecting the release fork 132 to the bell crank arm.

In this form of the invention, the release fork must be tilted slightly in a slightly clockwise direction indicated by the arrow m in order to disengage the clutch. By tilting the release fork in this direction, the link 131 forces the throw out bearing 125 against the release fingers 124 to disengage the clutch as previously described.

Figure 7:
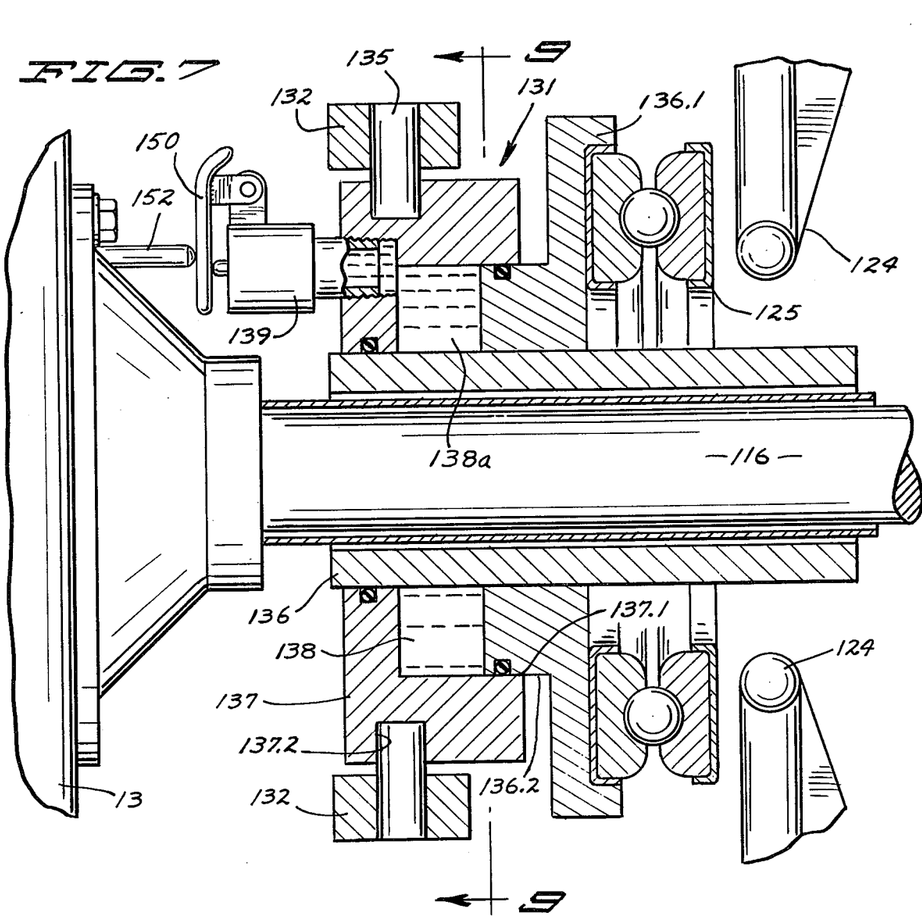
FIG. 7 is an enlarged detail section view taken approximately at 7—7 in FIG. 6.

The length adjustable hydraulic fluid filled link 131 has a pair of inner and outer telescopically related parts 136 and 137, respectively, which define a hydraulic fluid chamber 138a therebetween filled with hydraulic fluid 138. The inner telescoping part is a sleeve which embraces and extends along the transmission input shaft 116. The sleeve 136 has a mounting flange 136.1 which mounts the throw out bearing 125.

Figure 8:
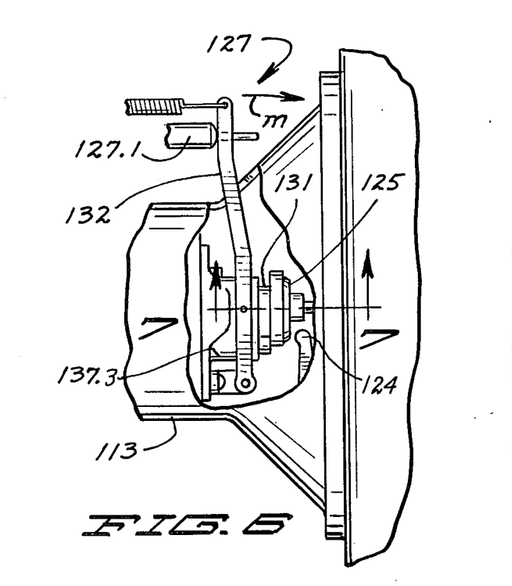
FIG. 8 is an enlarged detail section view of the relief valve utilized in the form illustrated in FIGS. 6 and 7.
Figure 9:
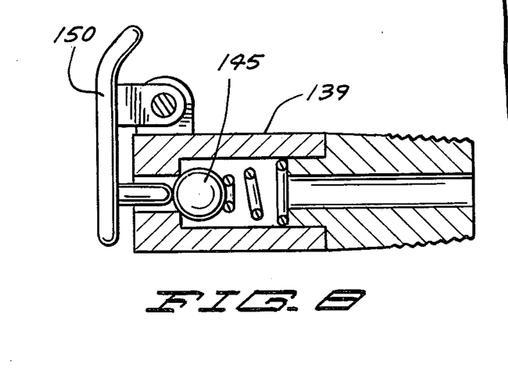
FIG. 9 is an enlarged detail section view taken approximately at 9—9 in FIG. 7.

The outer telescoping part 137 is annular in shape and has an inner cylindrical surface 137.1 which slides along an outer cylindrical shoulder 136.2 of the sleeve 136. The hydraulic fluid 138 is trapped in the chamber and is placed under substantial compression pressures when the clutch linkage operates the release fingers 124 in the normal way for disengaging the clutch, and also when the progressive tilting of the release fingers 124, caused by wearing of the clutch disc, exerts pressure in a rearward direction outwardly through the throw out bearing. A relief valve 139 is threaded into a tapped aperture on the outer part 136 in communication with the hydraulic fluid chamber, for relieving the pressure of the hydraulic fluid in the chamber, by allowing a small quantity of the fluid to escape when the operator 150 of the valve engages the stop 152 as the valve is moved against the stop. The operator 150 causes the ball valve 145 to be unseated, thereby allowing escape of a small quantity of hydraulic fluid.

Such operation of the valve 139 is caused by the progressive tilting of the release fingers against throw out bearing 125 while the linkage 127 is in its rest position. The relief of pressure on the hydraulic fluid 138 and the escape of a small quantity of the liquid allows the throw out bearing to withdraw slightly from the release fingers, thereby allowing the clutch to remain fully engaged without slipping.

In this form of the invention, the outer telescoping part 137 is provided with an ear 137.1 with an aperture through which a guide rod 137.3 is slidably related. The guide rod 137.3 is affixed to the transmission housing 113 so as to prevent the outer telescoping part 137 from revolving. It will be seen in FIGS. 7 and 9, that the release fork is connected to the outer telescoping part 137 by a pair of pins 135. An annular receiving groove 137.2 receives the pins 135 in order to cause the link 131 and bearing 125 to move upon tilting of the release fork 132.

FIG. 10 illustrates an alternate form of release valve 239 which may be useful in certain physical arrangements. In FIG. 10, the valve housing 240 has a base 241 is externally threaded to be turned into a tapped aperture of a length adjustable link so that the interior port 242 is in communication with the hydraulic fluid chamber of the link. The valve base includes a generally spherical head 240.1 with an opening 243 through the end thereof. A ball valve 245 is pressed against a valve seat 247 by a spring 246 anchored against an insert 248 in the valve opening 242.

The stationary frame part 210.1 of the vehicle will carry a valve operator 250 in stationary relation. The operator 250 has an open recess 250.1 therein, into which the head 240.1 will normally extend. A valve operating stem 249, rigid with the operator 250, is aligned with the opening 243 in the valve head to project therethrough and lift the valve ball 245 off the seat to allow a small quantity of hydraulic fluid to be discharged from the hydraulic fluid filled link to which the base 241 is attached.

It will be seen that I have provided a new and improved self-adjusting linkage for automotive type clutches to relieve the pressure exerted by the release fingers as they gradually tilt against the throw out bearing so as to reestablish the normal spacing between the throw out bearing and the release fingers. This adjustment is accomplished by incorporating a length adjustable hydraulic fluid filled telescoping link in the linkage between the throw out bearing and the clutch pedal in the operator's compartment. The length adjustable link has a release valve acting, when pressure is exerted on the linkage from the throw out bearing and release fingers, to bleed off a small quantity of the hydraulic fluid from the adjustable link, thereby changing the length of the linkage as a whole as to permit the throw out bearing to move slightly away from the release fingers and relieve the pressure therebetween. The length adjustable hydraulic fluid filled link may be arranged to shorten or lengthen when hydraulic fluid is bled off therefrom to accommodate different linkage arrangements which necessitate pulling or pushing the release fork in order to disengage the clutch. Further, as illustrated, the length adjustable hydraulic fluid filled link may be located in the linkage, either between the release fork and the clutch pedal, or may be located in the linkage between the release fork and the throw out bearing, and in the latter situation, the length adjustable hydraulic fluid filled link will embrace and be substantially concentric of the input shaft of the transmission.

What is claimed is:

1. Clutch operating apparatus accommodating progressive rearward tilting of the release fingers toward the throw out bearing as the clutch disc wears, comprising
    an operating linkage including a manual control and being connected to the throw out bearing,
    the linkage being movable between a rest position wherein the clutch is engaged and a shifted position wherein the throw out bearing has moved against and has forwardly tilted the release fingers to effect disengagement of the clutch, and
    the linkage also including a length adjustable, hydraulic fluid filled link, and
    hydraulic fluid flow control means connected to said link and operating in response to pressure exerted on the linkage in rest position by such rearward tilting of the release fingers as the clutch disc wears, and said control means operating to change the length of said link to relieve such pressure.

2. The clutch operating apparatus according to claim 1 and the flow control means including a normally closed valve.

3. The clutch operating apparatus according to claim 1 and the flow control means having a flow characteristic, when operated, to allow outward flow of hydraulic fluid from the link to effect the change of length of the link.

4. The clutch operating apparatus according to claim 1 and the link being arranged in the linkage to transmit force in compression when the linkage is in shifted position.

5. The clutch operating apparatus according to claim 1 and the fluid filled link being arranged in the linkage to transmit force in tension when the linkage is in shifted position.

6. The clutch operating apparatus according to claim 1 and a return spring urging the linkage toward the rest position, and a stop against which the linkage bears in said rest position.

7. The clutch operating apparatus according to claim 1 wherein the linkage includes a tiltable release fork adjacent the throw out bearing, the hydraulic fluid filled link being disposed in the linkage between the release fork and the manual control.

8. The clutch operating apparatus according to claim 7 and the fluid filled link being arranged in the linkage to transmit force in compression when the linkage is in shifted position.

9. The clutch operating apparatus according to claim 7 and the fluid filled link being arranged in the linkage to transmit force in tension when the linkage is in shifted position.

10. The clutch operating apparatus according to claim 7 and the fluid filled link being arranged to apply compressive pressure on the hydraulic fluid in response to the rearward tilting of the release fingers, the flow control means opening, when operated, to permit discharge of the hydraulic fluid from the link.

11. The clutch operating apparatus according to claim 1 wherein the linkage includes a tiltable release fork adjacent the throw out bearing, the hydraulic fluid filled link being disposed in the linkage between the release fork and the throw out bearing.

12. The clutch operating apparatus according to claim 11 wherein the clutch has an output shaft extending through the throw out bearing, and the fluid filled link being annular and embracing the shaft.

13. The clutch operating apparatus according to claim 11 and the fluid filled link being arranged to apply compressive pressure on the hydraulic fluid in response to the rearward tilting of the release fingers, the flow control means opening, when operated, to permit discharge of the hydraulic fluid from the link.

14. The clutch operating apparatus according to claim 11 and the fluid filled linkage being arranged to apply compressive pressure on the hydraulic fluid in response to the rearward tilting of the release fingers, the flow control means opening, when operated, to permit discharge of the hydraulic fluid from the link.

15. The clutch operating apparatus according to claim 1 wherein the fluid filled link has telescoping parts enclosing a distensible and constrictable hydraulic fluid chamber.

16. The clutch operating apparatus according to claim 15 and the flow control means including a normally closed valve.

17. The clutch operating apparatus according to claim 16, and the link being arranged to apply compressive pressure on the hydraulic fluid therein in response to the rearward tilting of the release fingers, the flow control means opening, when operated, to permit discharge of the hydraulic fluid from the link through the valve.

18. The clutch operating apparatus according to claim 1 and said fluid filled link being arranged to apply compressive pressure on the hydraulic fluid therein in response to the rearward tilting of the release fingers, the flow control means opening when operated to permit discharge of a quantity of hydraulic fluid from the link to change the length of the link.

19. The clutch operating apparatus according to claim 12 and the link being arranged in the linkage to transmit force in compression when the linkage is in shifted position.

20. The clutch operating apparatus according to claim 18 and the link being arranged in the linkage to transmit force in tension when the linkage is in shifted position.

21. The clutch operating apparatus according to claim 18 and the fluid filled link having telescoping parts enclosing a distensible and constrictable hydraulic fluid chamber.

22. The clutch operating apparatus according to claim 18 and the flow control means having flow characteristics, when operated, to allow outward flow of hydraulic fluid from the link.

23. The clutch operating apparatus according to claim 1, and there being a frame adjacent the link, the flow control means including a valve with movable means to operate the valve and also including a valve operator to engage such movable means, the valve and valve operator being located between the link and the frame and mounted thereon to operate the valve in response to the rearward tilting of the release fingers.

24. The clutch operating apparatus according to claim 23 and the link having telescoping parts enclosing a distensible and constrictable hydraulic fluid chamber, the valve being mounted on one of the telescoping parts.

* * * * *